(12) United States Patent
Okuniewicz

(10) Patent No.: US 9,202,333 B2
(45) Date of Patent: *Dec. 1, 2015

(54) GAMING DEVICE WITH A SECURE INTERFACE

(71) Applicant: Douglas M. Okuniewicz, Post Falls, ID (US)

(72) Inventor: Douglas M. Okuniewicz, Post Falls, ID (US)

(73) Assignee: Aim Management, Inc., Post Falls, ID (US)

( * ) Notice: Subject to any disclaimer, the term of this patent is extended or adjusted under 35 U.S.C. 154(b) by 175 days.

This patent is subject to a terminal disclaimer.

(21) Appl. No.: 14/059,179

(22) Filed: Oct. 21, 2013

(65) Prior Publication Data

US 2014/0045577 A1 Feb. 13, 2014

Related U.S. Application Data

(63) Continuation of application No. 13/084,363, filed on Apr. 11, 2011, now Pat. No. 8,562,431, which is a continuation of application No. 11/032,388, filed on Jan. 10, 2005, now Pat. No. 7,922,577, which is a continuation of application No. 09/639,441, filed on Aug. 15, 2000, now Pat. No. 6,840,860, which is a continuation-in-part of application No. 08/994,075, filed on Dec. 19, 1997, now Pat. No. 6,146,276, and a continuation-in-part of application No. 08/795,152, filed on Feb. 7, 1997, now Pat. No. 5,908,354.

(51) Int. Cl.
*A63F 13/12* (2006.01)
*G07F 17/34* (2006.01)
*G07F 17/32* (2006.01)
*G06F 3/16* (2006.01)
*A63F 3/08* (2006.01)
*A63F 1/00* (2006.01)

(52) U.S. Cl.
CPC .............. *G07F 17/3227* (2013.01); *G06F 3/16* (2013.01); *G07F 17/32* (2013.01); *G07F 17/3202* (2013.01); *G07F 17/3248* (2013.01); *G07F 17/34* (2013.01); *A63F 3/081* (2013.01); *A63F 2001/008* (2013.01)

(58) Field of Classification Search
USPC ......................................... 463/20, 29, 35, 36
See application file for complete search history.

(56) References Cited

U.S. PATENT DOCUMENTS

| | | | |
|---|---|---|---|
| 5,816,918 A * | 10/1998 | Kelly et al. | 463/16 |
| 2005/0153765 A1* | 7/2005 | Shoostine | 463/9 |
| 2009/0143141 A1* | 6/2009 | Wells et al. | 463/37 |
| 2011/0263325 A1* | 10/2011 | Atkinson | 463/31 |
| 2012/0283012 A1* | 11/2012 | Bainbridge et al. | 463/30 |
| 2013/0196755 A1* | 8/2013 | Nelson et al. | 463/29 |

* cited by examiner

*Primary Examiner* — Pierre E Elisca
(74) *Attorney, Agent, or Firm* — David E. Nixon; Bradley Arant Boult Cummings LLP

(57) ABSTRACT

A system for an electronic gambling device output has been developed. The system includes, a first computing device with gambling device game logic circuitry that generates an output signal that includes output content tested and approved by a gaming regulatory authority for use by an output device of the electronic gambling device. The system also includes a second computing device that controls the output of the tested output content by the output device commands the output of output content that has not been tested by the gaining regulatory authority. The untested output content replaces or supplements the tested output content as determined by the second computing device.

13 Claims, 11 Drawing Sheets

GAMING DEVICE WITH A SECURE INTERFACE

CROSS REFERENCE TO RELATED APPLICATIONS

This application is a continuation of U.S. patent application Ser. No. 13/084,363 entitled "An Improved Gaming Device and Secure Interface" filed on Apr. 11, 2011, now U.S. Pat. No. 8,562,431, which is a continuation of U.S. application Ser. No. 11/032,388 entitled "Gaming Device and Secure Interface" filed on Jan. 10, 2005, now U.S. Pat. No. 7,922,577, which is a continuation of U.S. application Ser. No. 09/639,441 entitled "Printing and Dispensing Bonusing System for Gaming Devices" filed on Aug. 15, 2000, now U.S. Pat. No. 6,840,860, which is a continuation-in-part of U.S. application Ser. No. 08/994,075 filed on Dec. 19, 1997, now U.S. Pat. No. 6,146,276, which is a continuation-in-part of U.S. application Ser. No. 08/795,152 now U.S. Pat. No. 5,908,354, filed Feb. 7, 1997.

FIELD OF INVENTION

This invention relates to a bonus dispensing system for gaming devices and, more particularly, to a programmable printing and dispensing bonusing system for electronic gaming devices including slot machines, video poker machines and other such electronic gaming devices which includes at least one detection device connected an electronic gaming device, an event detection sampling device in information transmission connection with the detection device operative to identify particular events, a programmable event occurrence information signal computing device connected to the event detection sampling device, the programmable event occurrence information signal computing device operative to output command signals therefrom and a printing/dispensing bonus device connected to said programmable event occurrence information signal computing device operative to output bonus payout information and items resulting from particular combinations being produced by the electronic gaming device.

BACKGROUND ART

Slot machines and video poker machines continue to be the most widely used types of gaming devices found in the gaming industry. The oldest slot machines and video poker machines were relatively simple devices which included little in the way of sound generating devices, commonly including only a bell or buzzer to signify a winning combination on the reels. With the advent of new technology in the gaming industry, the slot machines and video poker machines were now able to produce a variety of pre-programmed sounds through the use of computer chip technology. These chips are most often constructed as integral parts of the gaming device and are programmed at the factory to produce a limited number of sounds in response to events such as a winning combination coming up on the reels. The sounds produced by the machine can be of high quality through the use of efficient loudspeaker systems.

In spite of the use of such new technology, one of the major disadvantages found in the prior art regarding the sounds produced by the slot machine has gone unaddressed. Specifically, because the chips are programmed by the factory, the sounds and payouts produced by the machine cannot be changed by the customer, i.e., the casino. The sounds and payouts produced by the gaming device thus are always the same, absent game modifications, and the gaming public may lose interest in play of the machine due to the lack of any changes in the output of the machine when winning combinations are produced. It is important to understand that on most machines the sound and payout information and the payout tables are programmed on the same chip. If a user of the gaming device wishes to modify the sounds or bonuses produced by the machine, the chip containing the sound bytes must be "reburned" or reprogrammed by the factory or the casino. The reprogramming of the chip, however, will mandate review and testing of the chip by an independent testing laboratory and/or by the state gaming commission to confirm that nothing on the chip was modified except for the sounds themselves. Obviously, if retesting of the chip each time the smallest change in sound or bonuses designated by the chip is necessary, no casino location will wish to go through the process due to the length of time and expense of development and testing involved. There is, therefore, a need for a device for inclusion in a gaming device which is capable of being quickly and easily reprogrammed to produce a different sound or bonus payout in response to a particular event occurrence, and which does not require retesting by an agent of the gaming commission each time a new sound or bonus is included.

It is thus seen that a disadvantage of the prior art is that the sound-producing devices found in gaming devices cannot be modified by the casino to produce alternative sounds. However, it is a further disadvantage of the prior art that the sound-generating devices on all but the newest machines are often technologically insufficient to produce such sounds as human speech and difficult-to-reproduce sounds. It therefore may be desirable to enhance the sound-producing capabilities of the gaming device by "adding on" a more sophisticated sound card. Due to restrictive gaming regulations, however, any such add-on sound card would have to be incapable of influencing the outcome probabilities of the gaming device, thus requiring a type of detection means for detecting specific event occurrences on the electronic circuit board or the reels of the gaming device. At present, such read-only detection devices are not found in the prior art, as most, if not all, of the sound-producing devices found in the prior art are integrated into the gaming device and such read-only detection devices are not necessary. With the rapid improvement in sound cards, however, the need for non-intrusive read-only detection devices for use in combination with an add-on sound card has arisen. There is therefore a need for such a read-only detection device used in combination with an add-on sound card.

One of the most recent innovations in gaming is the multi-machine jackpot, such as Quartermania, Megabucks and Cool Millions. In these games, a bank of gaming machines are connected to one another in information transmission connection such that coin input at each of the machines adds to an overall jackpot which can be hit on the any of the machines in the group. These wide-area progressive games have acted to increase game play thus increasing the handle of the casino. The disadvantage to such wide-area progressive games is that the casino is again prevented from modifying the sound or bonusing output of the machine when a jackpot or other winning combination is achieved. The casino may desire to formulate its own location-specific games, such as treasure hunts or other such games, in which the treasure would be "found" by a specific reel combination turning up on the machine. Should such a reel combination come up on the machine, the player would be notified by casino-specific sounds emanating from the machine. It also may be desirable to have "treasure hunts" between multiple casino locations having wide-area progressive games, but again the sounds emitted by the machine must be modified to reflect the new game play. Obviously, the sounds included in the machine from the factory are not designed with this type of option in mind, and it would be necessary for the casino to be able to interrupt the ordinary sound production of the gaming device and substitute its own desired sound output for particular event occurrences. It is believed that the variety offered by such sound variations will significantly increase "coin in" on the various machines due to the heightened interest in the modified games.

Another disadvantage found in those devices representative of the prior art is that when an update of sound produced is desired, the chip carrying the sounds must be reprogrammed or "reburned". As was stated previously, on many machines the audio files are stored on and played by the same chip that controls the payouts and pay tables for the machine. Therefore, each time the chip is reprogrammed to issue new sounds, the modified chip must be retested by an independent laboratory and/or the state authorities. Obviously, a casino organization which has invested millions of dollars in slot machines does not wish to lose the use of the slots for a period of time during testing each time the sounds produced by the machine are modified. There is therefore a need for an easily updatable and reprogrammable sound-producing device for use in slot machines and the like that will increase the usable life span of the slot machine and, more importantly, require only a single round of testing when initially added to the machine.

There are several examples of devices in machines proposed in the prior art which attempt to increase the amount of "coin in" by increasing interest in the games. For example, Nishikawa, U.S. Pat. No. 4,522,399, discloses a device for generating an impact sound for a slot machine, the device intentionally producing an impact sound when reels start to be rotated by motors. Clearly, however, this device cannot be modified in any meaningful way to produce a variety of sounds and thus its application to the gaming industry is limited.

It has also been found that there is a substantial interest in the development of a bonusing system for electronic gaining devices which outputs bonus items, the items either having intrinsic value or being representative of the bonus received and which are redeemable for the indicated bonus. As was stated previously, any such add-on electronic activity detector would have to be incapable of influencing the outcome probabilities of the gaming device, and thus a uni-directional detection device for detecting specific event occurrences on the electronic circuit board would be preferred. In a typical slot machine, there are numerous machine event occurrences which would need to be sampled in order to determine whether the particular event has occurred. These include such occurrences as a bill accepted into the machine, a jackpot being hit, coin in, coin out and other display data. Each of these machine inputs and outputs would need to be monitored to determine event occurrences, but must be monitored in such a way that the event occurrence cannot be tampered with in order to conform to applicable gaming regulations. Therefore, as was stated previously, there is a need for an electronic activity detector and command generator which is capable of detecting event occurrences on the circuit board of a gaming device and then issue appropriate demands in response to those event occurrences which will cause connected output devices to perform designated tasks.

By way of clarification, the electronic activity detecting portion of the card is that portion of the card that will identify that an event is taking place within the machine (i.e., coin in, jackpot. etc. . . . ), and the command portion of the card is that portion which recognizes the event and dictates the proper response. Although it is expected that one of the major output functions of any card performing these functions would be that of sound reproduction, there is also a need for other types of outputs, including printer functions, lights and gaming information. It is important to note that there are no devices found in the prior art which can be connected to one or more output devices such as a sound card, a printer, a set of lights or a player's card information system. There is therefore a need for a device which can read and react to gaming machine outputs, and, depending on the programming of the device, output the appropriate command signals to output devices to drive the output devices to perform their respective functions without affecting the regulated components of the gaming device.

At the present time, bonuses on gaming devices are delivered through the standard payment mechanism of an individual machine. For example, if a specific reel combination is hit for 25 coins plus a spin of the bonus wheel, the wheel will spin and stop on a number or multiplier in an apparently random fashion (i.e., if it stops on 50 coins then a total of 75 coins were won). However, the total payment of 75 coins was predetermined at the time the reel combination was hit, and therefore in cases like this the bonuses are not really "bonuses" but rather a split payment of the actual payout with one part of the split payment having the appearance of a bonus.

It has also been found that increased game play can result from the dispensing or paying of bonuses in connection with particular reel or display combinations on the electronic gaining device being hit. Such bonusing items could include plush toys, vouchers for meals, cash, lottery tickets, coupons, promotional materials, other prizes or almost any other type of prize award. At the present time, the prior art does not disclose the dispensing or printing of a bonus item from a secondary output device not directly associated with the standard payment device on the gaming device, most commonly a coin or scrip dispenser, the bonus being dispensed in connection with a predetermined event or series of events occurring on the gaming device, such as coin in or a particular combination being "hit" on the electronic gaming device. There is therefore a need for such a bonusing system which would both increase game play and decrease the dissatisfaction of the consumer, as a reel combination that is not ordinarily a payout combination may result in the obtaining of bonus prizes.

Therefore, an object of the present invention is to provide a printing and dispensing bonusing system for electronic gaming devices.

Another object of the present invention is to provide a printing and dispensing bonusing system for electronic gaming devices which includes at least one detection device adapted for connection to an electronic apparatus which is operative to detect selected event occurrences on the electronic apparatus and output event occurrence notification signals upon detection of an event.

Another object of the present invention is to provide a printing and dispensing bonusing system for electronic gaming devices which includes an event detection sampling device in information transmission connection with the detection devices, the event detection sampling device operative to receive and detect the event occurrence notification signals from the detection devices, analyze the signals and output event occurrence information signals specifying the occurrence of a preselected event or events on the electronic apparatus circuit board.

Another object of the present invention is to provide a printing and dispensing bonusing system for electronic gaming devices which includes a programmable event occurrence information signal computing device in information transmission connection with the event detection sampling device, the computing device operative to receive and analyze event occurrence information signals output by the event detection sampling device and upon detection of event occurrence information signals, output command signals for initiating operation of a printing and dispensing device connected to the programmable event occurrence information signal computing device, the printing and dispensing device operative to dispense or print a bonus item or information from a secondary output device not directly associated with the standard coin or scrip dispenser, the bonus being dispensed in connection with at least one event occurring on the electronic gaming device.

Another object of the present invention is to provide a printing and dispensing bonusing system for electronic gaming devices which may be quickly and easily reprogrammed to produce different outputs in response to the same reel combinations turning up on the machine.

Another object of the present invention is to provide a printing and dispensing bonusing system for electronic gaming devices, particularly a casino gaming device, which is capable of sampling event occurrences on the circuit board of the gaming device that is clearly incapable of influencing the outcome of any gaming event in the gaming device, thus permitting the electronic activity detector and command generator to be added to gaming machines while requiring only minimal inspection by a gaming commission or its agent. Future operational modifications will not require reinspection by the gaming commission or its agent.

Finally, another object of the present invention is to provide a printing and dispensing bonusing system for electronic gaining devices which is durable in construction and safe and efficient in use.

SUMMARY OF INVENTION

In some aspects, the invention relates to a system for an electronic gambling device output, comprising: a first computing device comprising gambling device game logic circuitry operative to command generation of an output signal comprising output content tested and approved by a gaining regulatory authority for output by an output device of the electronic gambling device; and a second computing device that is operative to control the output of the tested output content by the output device and is further operative to command the output of output content that has not been tested by the gaming regulatory authority where the untested output content replaces or supplements the tested output content as determined by the second computing device.

In other aspects, the invention relates to a delivery method for providing supplemental slot machine output content through a slot machine, comprising: offering slot machine output content that has been tested by a gaming commission in a jurisdiction that requires slot machine output content to be tested by the gaming commission prior to offering the slot machine output content for public consumption; offering supplemental slot machine output content that has not been tested by the gaming commission where the delivery of the supplemental slot machine output content is approved by the gaming commission negating the requirement for the gaming commission to test the supplemental slot machine output content; maintaining a separation between the tested content and the untested content with a software construct that prevents the untested content from changing the tested content; and executing the tested content and the untested content with a slot machine computing device comprising slot machine game logic circuitry.

Other aspects and advantages of the invention will be apparent from the following description and the appended claims.

BRIEF DESCRIPTION OF DRAWINGS

It should be noted that identical features in different drawings are shown with the same reference numeral.

DETAILED DESCRIPTION

The following description discloses two embodiments of the present invention. The first embodiment is a programmable electronic activity detector and command generator illustrated in FIGS. 1-3E.

Figure 1:
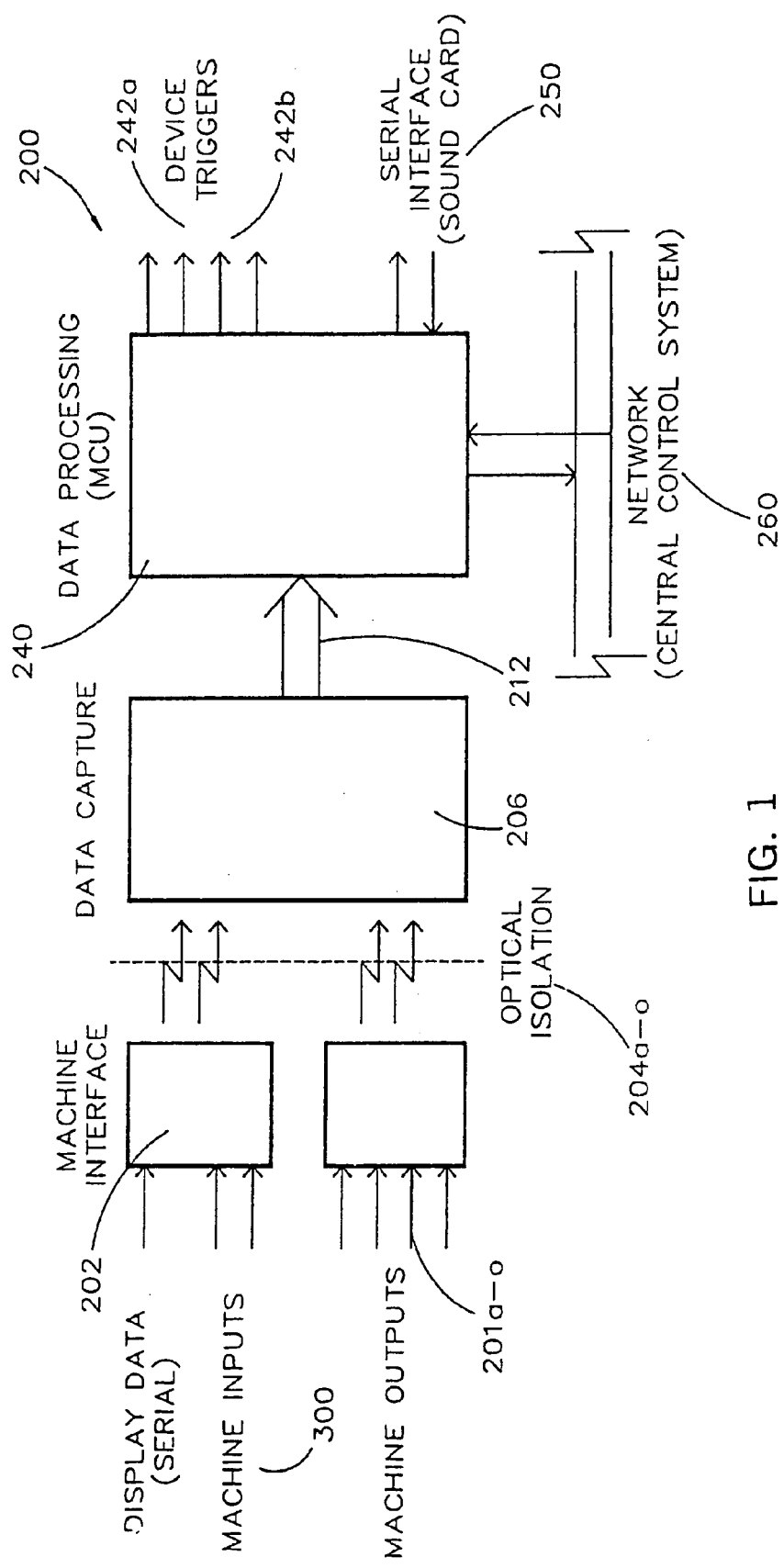
FIG. 1 is a high level block diagram of the present invention showing the elements thereof.
Figure 2A:
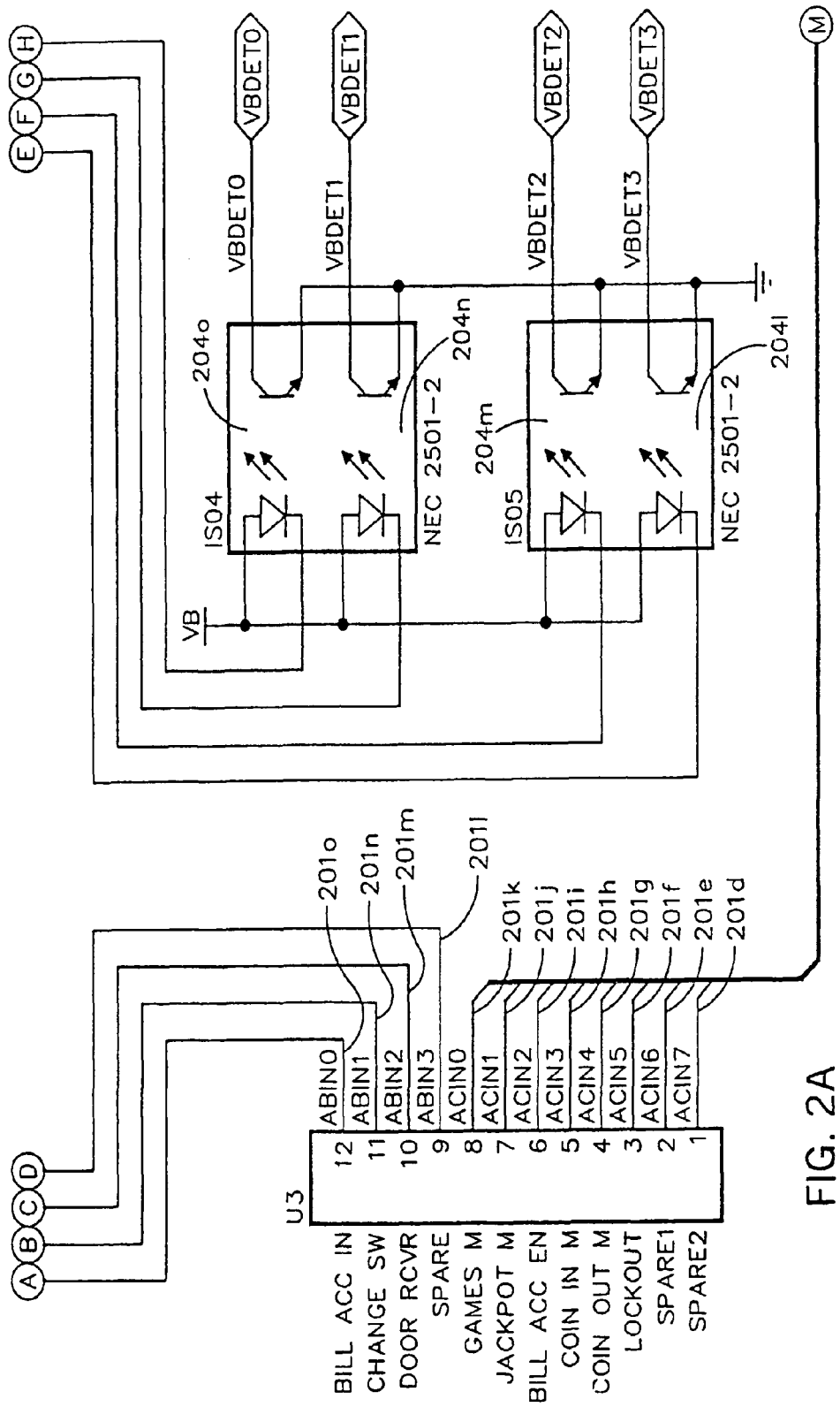
FIGS. 2A-2E are detailed circuit diagrams of the input section of the electronic activity detector and command generator.
Figure 2B:
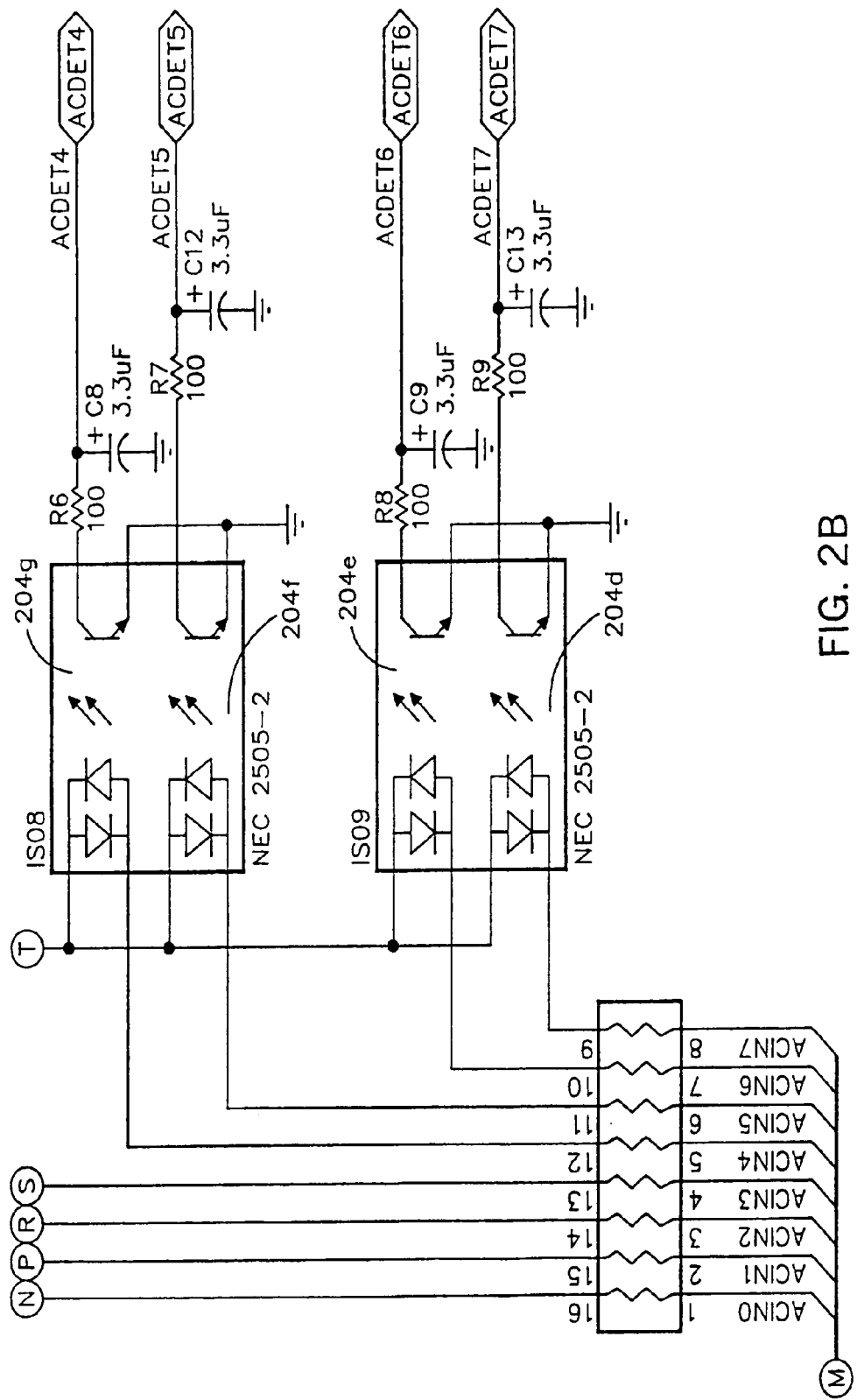
Figure 2C:
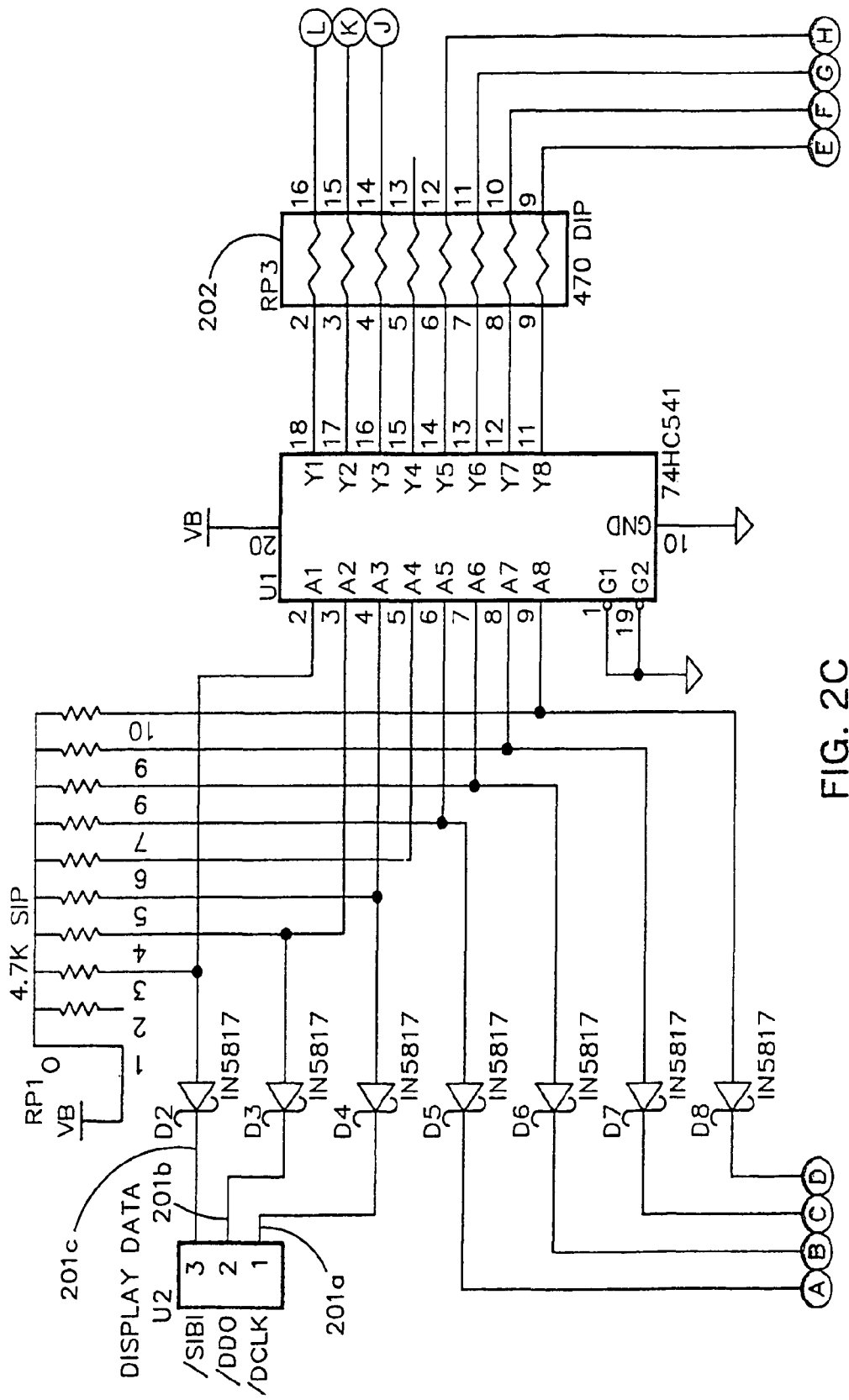
Figure 2D:
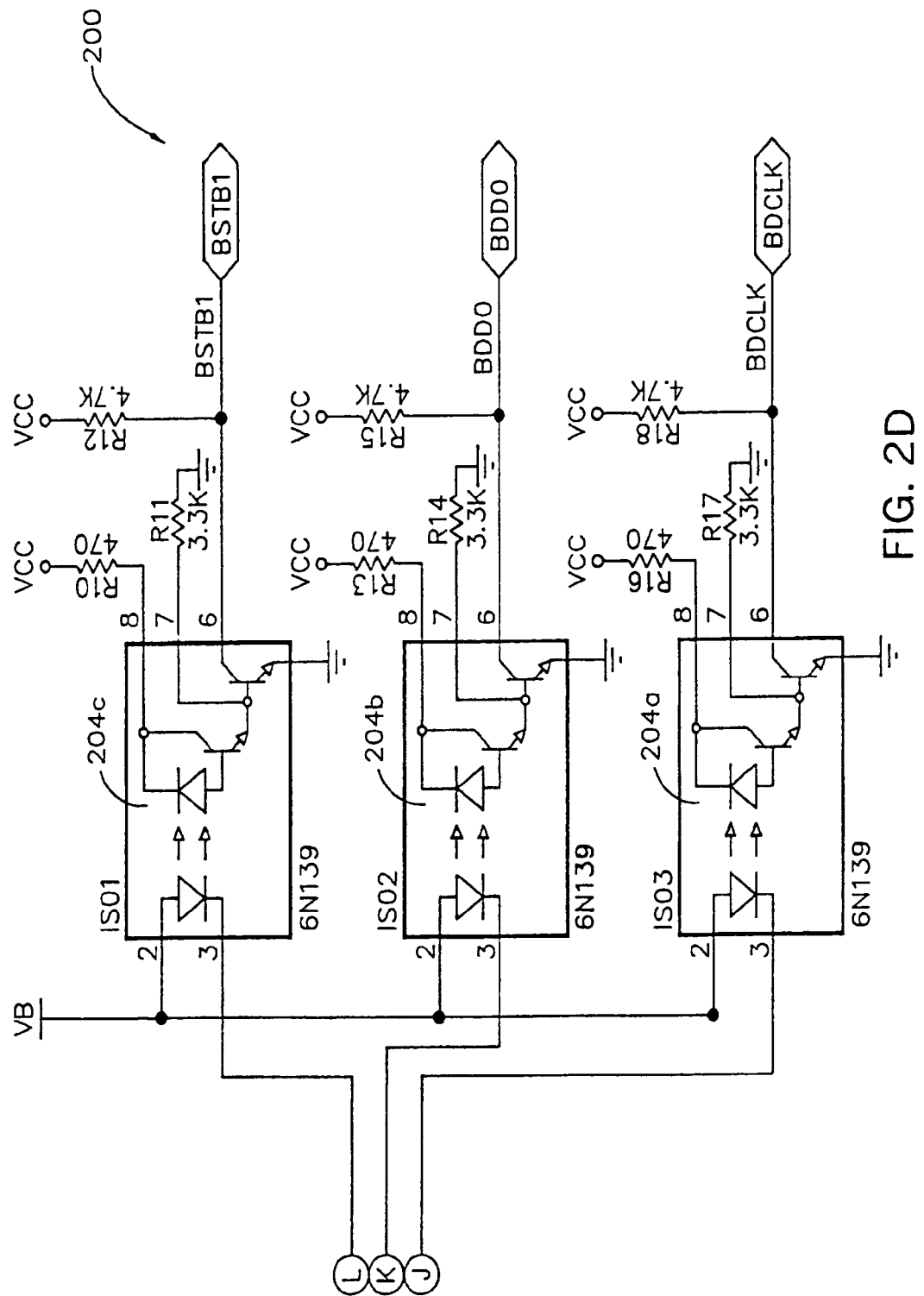
Figure 2E:
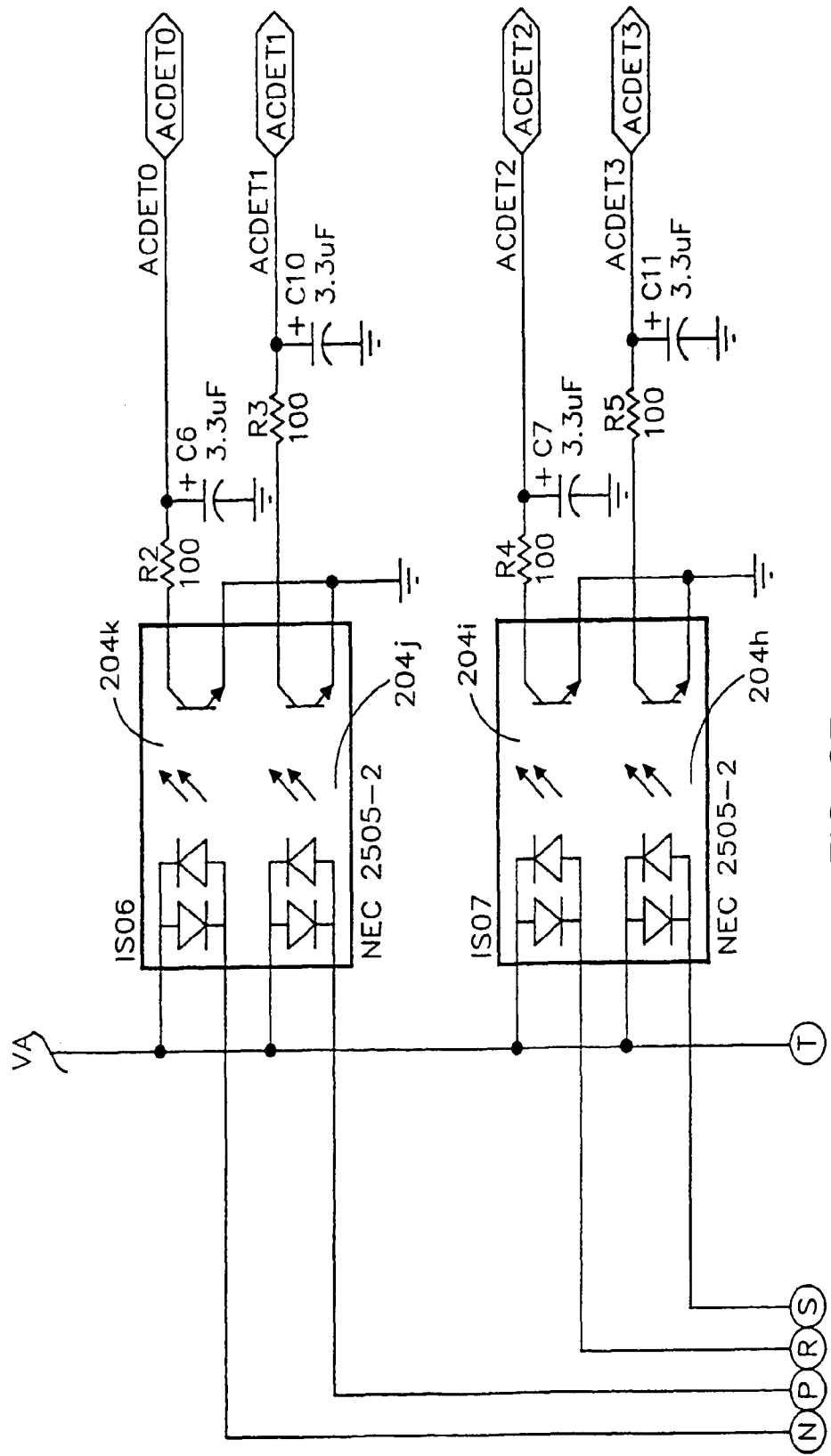
Figure 3A:
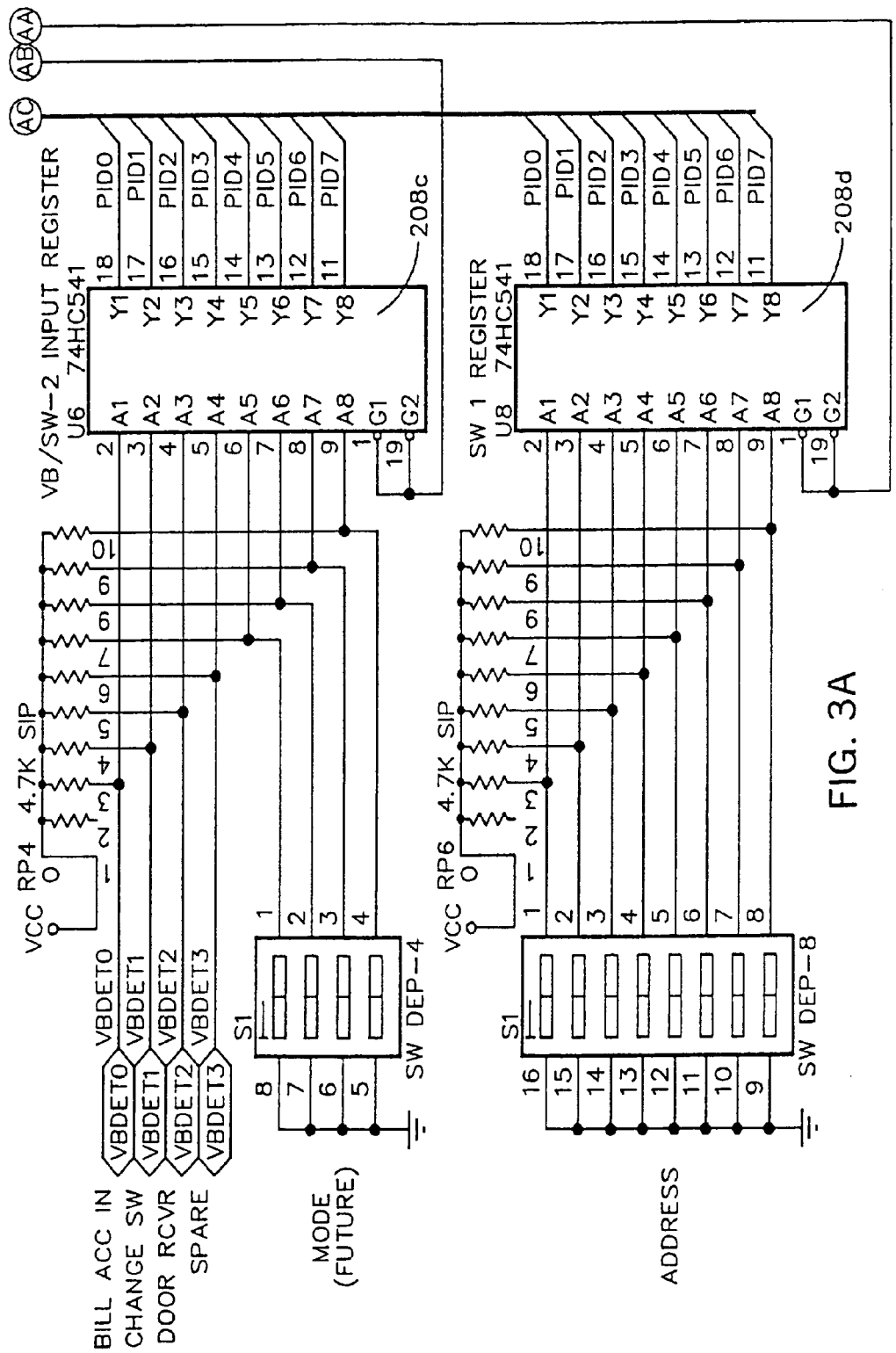
FIGS. 3A-3E are detailed circuit diagrams of the event occurrence information signal computing device or main computing unit showing the inputs and outputs thereof.
Figure 3B:
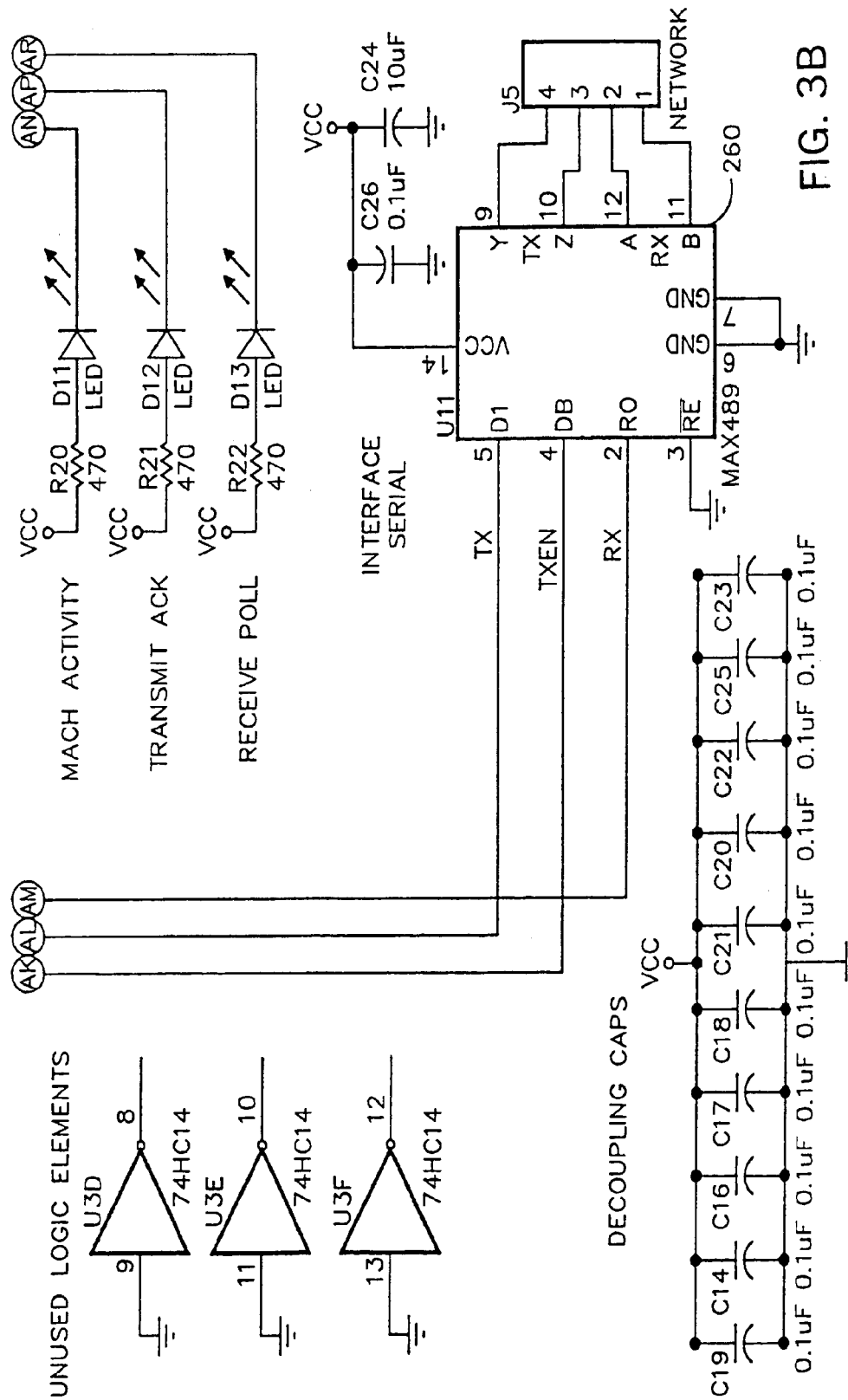
Figure 3C:
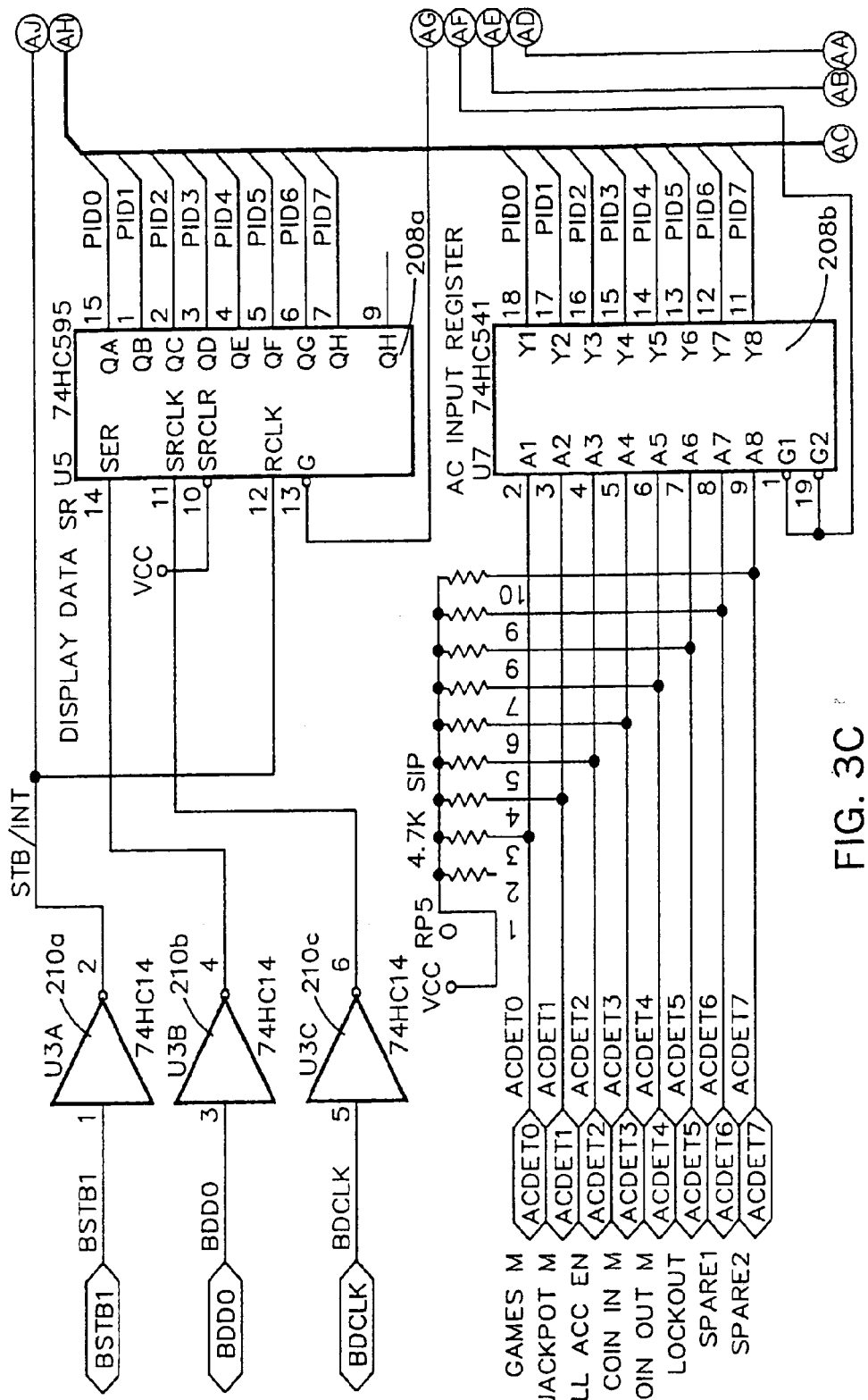
Figure 3D:
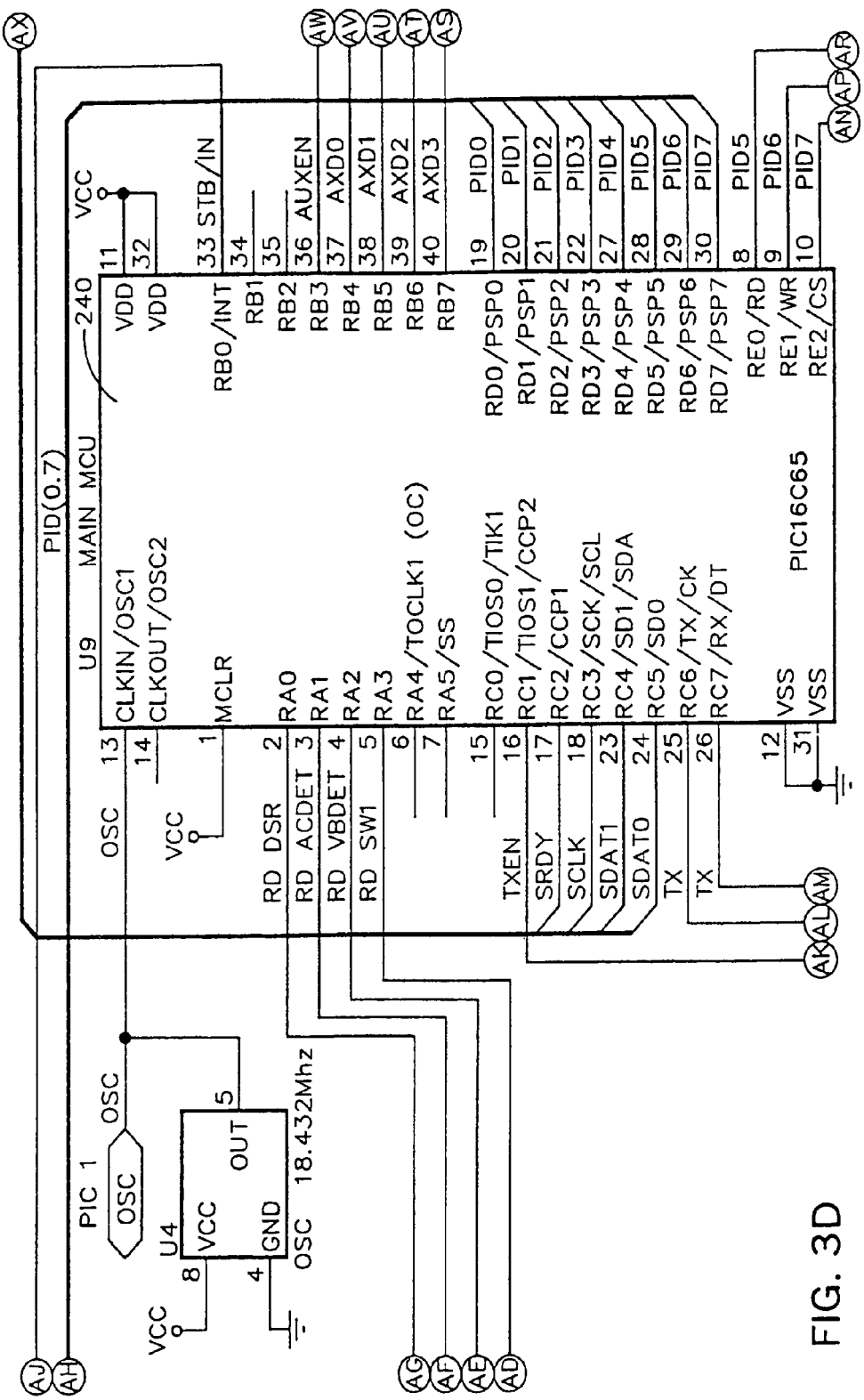
Figure 3E:
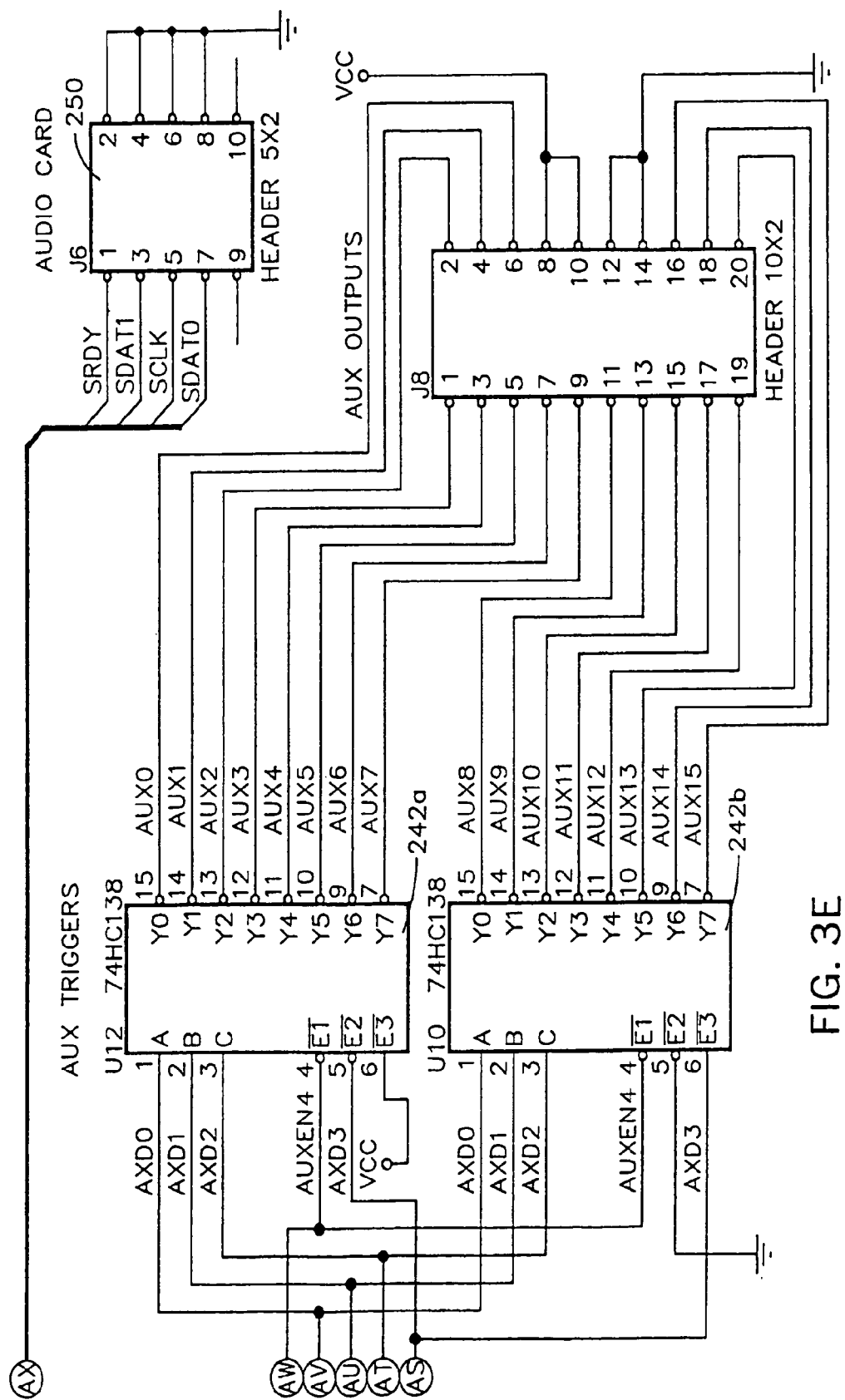

FIGS. 2A-2E and 3A-3E illustrate the programmable electronic activity detector and command generator 200 of the present invention. As shown in FIG. 1, the embodiment includes a machine interface 202 which consists of the connection of the programmable electronic activity detector and command generator 200 to the circuit board 300 of an electronic device. In this instance, as shown in FIGS. 2A-3E, the electronic device would be a typical slot machine having display data output, machine input information and machine output information which may be either sampled on the circuit board itself as will be necessary with many retrofit situations, or the slot machine may include a wiring harness which allows for simple connection to each of the data output locations from the circuit board. In either event, the machine interface 202 will access the information sites on the circuit board and allow for the event occurrence data to be transferred to the programmable electronic activity detector and command generator 200.

The machine interface 200 is connected, in the preferred embodiment, through a series of diodes and dip switches to the event detector devices 204a-o which operate to read the machine outputs. The event detector devices may be of various types of detectors, including optical isolators or the like, so long as the primary function of unobtrusively determining event occurrences is fulfilled. Each of the event detector devices 204a-o are connected to one of the machine output lines 201a-o and therefore when an event occurs on any of the machine output lines 201a-o, the event detector device 204a-o associated with that event will signify the occurrence of that event yet prevent any potential modification of the event status due to the one-way nature of the event detector devices. After the event detector device 204a-o activates in response to event occurrence on the machine board, the event occurrence notification signal corresponding to that event occurrence is transmitted to the data capture segment 206 of the embodiment 200. The data capture segment 206 consists of a plurality of input registers which receive the incoming event occurrence notification signal from the event detector devices 204a-o and interfaces the signal from the machine interface 202 to the event occurrence information signal computing device or main computing unit 240. The input registers 208b and 208c are each preferably connected to the machine inputs and machine outputs on the machine output line 201d-o whereas input register 208a is preferably connected to the display data coining from the machine output lines 201a, 201b and 201c. The display data is in serial format coming from the circuit board 300 of the slot machine and thus must be changed over to parallel to permit the main computing unit 240 to access the incoming display data. For this reason, each of the incoming display unit lines is converted from serial to parallel format by an appropriate converter, shown as converter units 210a, 210b and 201c. The display data is then fed into input register 208a before being forwarded onto the main computing unit 240. Finally, input register 208d is designed for use with eight-bit addressing systems for future possible uses.

It should be clear that an additional operational feature of the data capture portion 206 of the embodiment 200 of FIGS. 1-3E is that the data capture portion 206 must be organized to permit the main computing unit 240 to sample the incoming data to determine event occurrences on the circuit board 300 of the slot machine. This would commonly be done by clock pulse synchronization or multiplexing in which the main computing unit 240 is programmed to periodically "poll" each of the input registers 208a-d to determine if an event has occurred. Each of the input registers 208a-d may be polled in turn to determine an event occurrence detected by the input registers 208a-d thus permitting the connection of all of the input register outputs to be placed on a signal bus line 212 leading to the main computing unit 240. The polling operation will be made more clear in the discussion regarding the main computing unit 240, but it should be generally understood that the input registers 208a-d operate in a manner generally understood by those skilled in the art.

The input registers 208a-d of the data capture portion 206 are connected in information transmission connection by bus 212 to the programmable event occurrence information signal computing device 240 which will, be referred to herein as the MCU (main computing unit). The MCU 240 is programmed to scan the input registers within the data capture portion 206 of the alternative embodiment and remove, identify and compare the event occurreñ[1]ce notification signals found within those registers to a decision table preloaded into the registers of the MCU 240 itself. This decision table may take any accepted form so long as the MCU 240 is able to access the data, identify particular event occurrence information signals and output command signals to connected output devices which command those output devices to perform certain functions based on particular machine events. For example, common machine events may include coin in, handle pull, jackpot, any other payoff combination or non-winning combination or the like.

The MCU 240 will preferably be an eight-bit CMOS microcontroller manufactured by Microchip Technology, Inc., part No. PIC16C6X. Of course, it is to be understood that numerous other types of microcontrollers may be used with the present invention provided those microcontrollers are programmable to perform the same or similar operations. Although the MCU 240 is shown as being wired into the system in one particular design in FIGS. 3A-3E, it should be further understood that the exact layout and connection of the hardware elements described herein is not overly critical to the present invention so long as the embodiment 200 is able to function as intended. Furthermore, although the MCU 240 of the present invention is programmed using RISC code, it is to be understood that the exact object code to be used in the MCU 240 is not critical to the invention so long as the MCU 240 operates to perform all of its intended functions.

When the MCU 240 identifies that an event occurrence information signal received from one of the input registers 208a-d corresponds to a table event within the register of the MCU 240, the MCU 240, due to its programming, determines that a command signal should be sent to a connected output device. As best seen in FIG. 6, the MCU 240 is programmed and hardwired to output command signals in two basic formats, one being a simple command pulse or device trigger for the triggering of an output device such as a bell, whistle, or light, and the second being a serial interface for connection to more sophisticated output devices such as a sound card or a printer. The programmable electronic activity detector and command generator 200 of the present invention is designed to substitute alternative output device responses for particular event occurrences in the slot machine. Obviously, modification and/or replacement of all of the event occurrences produced by the machine is not necessary nor even advisable in many instances and therefore the MCU 240 is operative to replace or supplement only those events designated for replacement by the event table in the MCU and allow the remaining machine outputs to be produced normally by the slot machine.

When the MCU 240 detects that a designated event has occurred in the slot machine by a match of a selected event occurrence information signal and an event held within the table, the MCU 240 generates a command signal which is sent to connected output devices. Depending on the event occurrence in the slot machine, the command signal which is output by the MCU 240 will be a command pulse, which will be sent via the auxiliary triggers 242a and 242b which send a simple trigger pulse to connected output devices designed for activation by such command pulses, or will be a serial format command signal for commanding serial output devices such as an audio card, a printer or other such serial output device. The informá[1]tion transmission connection of the MCU 240 to the serial output devices would preferably consist of a serial peripheral interface 244 of an industry standard format. Finally, the serial command signals output by the MCU 249 would preferably be in standard serial format to permit the use of many different types of output devices with the programmable electronic activity detector and command generator 200, connection to which would be by a standard serial cable. Of course, as a virtually limitless number of types of output devices may be used with the presently described device, the command signals output by the MCU 240 may be modified to conform to the particular connected output device, as would be understood by one skilled in the art.

The command signals sent by the MCU 240 would preferably be in the format commonly used for command of printers, sound cards and the like to facilitate the use of the present invention with already existing hardware, and the programming and operation of such devices is well-known in the prior art. One important aspect of the present invention is that allowance has been made for the MCU 240 to include a network interface 260 which can be used to connect the programmable electronic activity detector and command generator 200 to a central control system (not shown). Through the network interface 260, the central control system will be able to collect event information from the slot machine and also will be able to download command information to the programmable electronic activity detector and command generator 200 to activate connected output devices. A prime example of the use of this connection would be to immediately reward a game player upon hitting a certain combination on the reels, which was being monitored over the central control system. It is expected that the network system would be implemented as was previously discussed, although any appropriate network system could be used for the present invention.

One other possible use of the present invention is as a tie-in with state-run lotteries in which the network capabilities of the present invention would be used to provide a wide-area "Powerball" type jackpot payoff on one particular combination being achieved. The specific nature of this implementation will be made apparent in future documentation, but this and other such examples serve to illustrate the virtually limitless possibilities for use of the present invention.

The second embodiment of the present invention is similar in function to the first embodiment, but incorporates additional features which further emphasize the unique aspects of the present invention. The bonus printing and dispensing method of the present invention includes the features of the previous embodiment but provides a bonus printing and dispensing device operatively connected to the MCU 240 and the command signals sent by the MCU 240 correspond to the occurrence of preselected event or series of events occurring on the electronic gaming device. The detection of a preselected event or series of events is performed by the event detector devices 204*a-o* which signal the occurrence of the event by the transmission of an event occurrence notification signal corresponding to that event occurrence to the data capture segment 206 of the embodiment 200. The event detector devices 204*a-o* may be of various types as described previously, and may even be constructed as integral elements of the gaming device, so long as they function to detect event occurrences in the gaming device. The MCU 240 is programmed to recognize those preselected event occurrences, the programming being done by standard programming methods understood to those skilled in the art, and issue command signals to the connected bonusing system of the present invention, which, in the preferred embodiment, may include a bonus information printing device, bonus item dispensing device and/or a connected electronic gaming device to output a bonus item or bonus information. It is important to note that the bonus printing or dispensing device is separate from the standard payout device of the electronic gaming device and is controlled separately by the MCU 240. This means that the bonus payout is independent of the regular payout and can be modified without affecting the payout of the gaming device. This allows the casino or operator to modify the bonus payouts according to its wishes, without requiring additional inspection by a gaming commission or its agent.

A preferred embodiment of the bonusing system of the present invention would include a printing device operative to print bonus prize information which would be redeemable for a selected bonus prize. When a preselected event or series of events occurs on the gaming device, the printing device is commanded by the MCU 240 to dispense a printed ticket or voucher which can be redeemed for the selected bonus item or prize. Alternatively, the system would include a dispensing device which could be a vending device or the like which operative to output bonus items including coin, cash, bonus tickets, lottery tickets, scratch off tickets, complimentaries, promotional materials, and other such bonus awards.

Of course, the key and critical element of the above invention is that bonus payout is printed or dispensed by a separate device independent of the standard payout device of the gaming device and is tied to the occurrence of selected reel or outcome combinations on the electronic gaming device, and other occurrences on the gaming device do not directly influence the bonus payout. The above-described invention is believed to provide a substantial improvement over the prior art, as the player of the gaming device will not only win standard payouts but will also win bonus prizes based on selected events or series of events occurring. Moreover, as the present invention provides a legitimate bonus versus a split payment of a predetermined amount, the player is more likely to continue playing the gaming device regardless of outcome, as they will still be receiving bonus prizes. Finally, as the present invention provides bonuses not connected with the payment calculations of the machine, the player may receive bonuses despite not hitting a standard payout combination.

It is to be understood that numerous additions, modifications, and substitutions may be made to the programmable electronic activity detector and command generator 200 and printing and dispensing bonusing system of the present invention which fall within the intended broad scope of the appended claims. For example, the microprocessors may potentially be combined into a single microprocessor chip programmed to perform the functions of each of the three chips. Furthermore, the specific object code used to program the microprocessors may be modified or changed in many ways so long as the function of each of the elements of the programmable electronic activity detector and command generator 200 and printing and dispensing bonusing system are able to function in the correct and efficient manner. Also, the detection devices of the present invention, described herein as optical interfaces, may be modified, changed or replaced entirely with detection devices which fulfill the intended function of identification of event occurrences and transfer of that information to the programmable electronic activity detector and command generator 200. Possibilities include optical readers which read the reel combinations produced by the machine and electromagnetic pulse detectors for detection of event occurrence signals, in addition to detectors directly connected to the gaming device or formed integrally therewith. Also, the exact designs and structures of the programmable electronic activity detector and command generator 200 and printing and dispensing bonusing system may be rearranged or modified as necessary to fit within the gaming device environment. Finally, the printing and dispensing bonusing system of the present invention may be modified or changed to issue different types of bonuses in connection with different series of occurrences on the gaining device, in addition to various types of printing and dispensing devices.

There have thus been shown and described a programmable electronic activity detector and command generator 200 and a printing and dispensing bonusing system which accomplish at least all of their stated objectives.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A system for an electronic gambling device output, comprising:
   a first computing device comprising gambling device game logic circuitry operative to command generation of an output signal comprising output content tested and approved by a gaming regulatory authority for output by an output device of the electronic gambling device; and
   a second computing device that is operative to control the output of the tested output content by the output device and is further operative to command the output of output content that has not been tested by the gaming regulatory authority where the untested output content replaces or supplements the tested output content as determined by the second computing device.

2. The system of claim 1, where the tested and untested content are generated in response to the same event.

3. The system of claim 2, where the event is sampled by the second computing device through a secure interface between the electronic gaming device and the second computing device that does not allow second computing device signals to alter the game logic circuitry of the electronic gaming device.

4. The system of claim 1, where the tested and untested content are generated in response to different events.

5. The system of claim 4, where the event is sampled by the second computing device through a secure interface between the electronic gaming device and the second computing device that does not allow second computing device signals to alter the game logic circuitry of the electronic gaming device.

6. A delivery method for providing supplemental slot machine output content through a slot machine, comprising:
  offering slot machine output content that has been tested by a gaming commission in a jurisdiction that requires slot machine output content to be tested by the gaming commission prior to offering the slot machine output content for public consumption;
  offering supplemental slot machine output content that has not been tested by the gaming commission where the delivery of the supplemental slot machine output content is approved by the gaming commission negating the requirement for the gaming commission to test the supplemental slot machine output content;
  maintaining a separation between the tested content and the untested content with a software construct that prevents the untested content from changing the tested content; and
  executing the tested content and the untested content with a slot machine computing device comprising slot machine game logic circuitry.

7. The method of claim 6, where the output content comprises content programming.

8. An output generation system for a slot machine output device, comprising:
  a processor;
  a first source of slot machine output device output information in electronic information transmission connection with the processor, the first source of output device output information containing output information related to a wagering game of the slot machine;
  a second source of slot machine output device output information in electronic information transmission connection with the processor, the second source of output device output information containing output information not related to the wagering game of the slot machine;
  a slot machine output device in information transmission connection with the processor, the slot machine output device being operative to generate an output responsive to at least one of:
  a.) the output information related to the wagering game of the slot machine and
  b.) the output information not related to the wagering game of the slot machine;
  where output information received by the output device is determined by the processor;
  where the second source of slot machine output device output information comprises an alterable source of information; and
  where the electronic information transmission connection between the processor and the first source of slot machine output device output information does not permit a communication from the second source of slot machine output device output information to alter the first source slot machine output device output information.

9. The output generation system for a slot machine output device of claim 8, where first source slot machine output device output information has been tested by a gaming commission prior to offering the first source slot machine output device output information for public consumption; and
  where second source slot machine output device output information has not been tested by the gaming commission prior to public consumption.

10. An output generation system for a slot machine output device, comprising:
  a processor;
  a first source of slot machine output device output information in electronic information transmission connection with the processor, the first source of output device output information containing output information related to a wagering game of the slot machine;
  a second source of slot machine output device output information in electronic information transmission connection with the processor, the second source of output device output information containing output information not related to the wagering game of the slot machine;
  a slot machine output device in information transmission connection with the processor, the slot machine output device being operative to generate an output responsive to at least one of:
  a.) the output information related to the wagering game of the slot machine and
  b.) the output information not related to the wagering game of the slot machine;
  where output information received by the output device is determined by the processor;
  where the second source of slot machine output device output information comprises an alterable source of information; and
  where the electronic information transmission connection between the processor and the first source of slot machine output device output information is incapable of permitting a communication from the second source of slot machine output device output information to alter the first source slot machine output device output information.

11. The output generation system for a slot machine output device of claim 10, where first source slot machine output device output information has been tested by a gaming commission prior to offering the first source slot machine output device output information for public consumption; and
  where second source slot machine output device output information has not been tested by the gaming commission prior to public consumption.

12. An output generation system for a slot machine output device, comprising:
  a processor;
  a first source of slot machine output device output information in electronic information transmission connection with the processor, the first source of output device output information containing output information related to a wagering game of the slot machine;
  a second source of slot machine output device output information in electronic information transmission connection with the processor, the second source of output device output information containing output information not related to the wagering game of the slot machine;

a slot machine output device in information transmission connection with the processor, the slot machine output device being operative to generate an output responsive to at least one of:

a.) the output information related to the wagering game of the slot machine and b.) the output information not related to the wagering game of the slot machine;

where output information received by the output device is determined by the processor;

where the second source of slot machine output device output information comprises an alterable source of information; and where the electronic information transmission connection between the processor and the first source of slot machine output device output information does not permit a communication unrelated to the wagering game of the slot machine to alter the first source slot machine output device output information.

13. The output generation system for a slot machine output device of claim 12, where first source slot machine output device output information has been tested by a gaming commission prior to offering the first source slot machine output device output information for public consumption; and where second source slot machine output device output information has not been tested by the gaming commission prior to public consumption.

\* \* \* \* \*